(12) United States Patent
Dornseiffer et al.

(10) Patent No.: US 7,666,376 B2
(45) Date of Patent: Feb. 23, 2010

(54) DIESEL PARTICULATE FILTER COMPRISING A FINELY DISPERSED DIESEL PARTICULATE CATALYST

(75) Inventors: Jürgen Dornseiffer, Aachen (DE); Helmut Hackfort, Köln (DE); Edgar Hünnekes, Wunstorf (DE)

(73) Assignee: Forschungszentrum Julich, Julich (DE)

( * ) Notice: Subject to any disclaimer, the term of this patent is extended or adjusted under 35 U.S.C. 154(b) by 836 days.

(21) Appl. No.: 10/481,822

(22) PCT Filed: Jun. 20, 2002

(86) PCT No.: PCT/EP02/06831

§ 371 (c)(1),
(2), (4) Date: May 28, 2004

(87) PCT Pub. No.: WO03/002853

PCT Pub. Date: Jan. 9, 2003

(65) Prior Publication Data

US 2004/0235658 A1 Nov. 25, 2004

(30) Foreign Application Priority Data

Jun. 26, 2001 (DE) .............................. 101 30 338

(51) Int. Cl.
*B01J 8/00* (2006.01)
(52) U.S. Cl. ................. 423/239.1; 423/210; 423/213.2; 423/215.5; 502/38
(58) Field of Classification Search ................. 423/210, 423/213.2, 215.5; 502/439

See application file for complete search history.

(56) References Cited

U.S. PATENT DOCUMENTS

| 3,947,380 | A | * | 3/1976 | Whelan et al. | ............... 502/302 |
| 4,346,557 | A | | 8/1982 | Shadman et al. | |
| 5,100,632 | A | | 3/1992 | Dettling et al. | |
| 5,290,530 | A | * | 3/1994 | Muramatsu et al. | ...... 423/239.1 |
| 5,505,911 | A | | 4/1996 | Hafele | |
| 5,921,076 | A | * | 7/1999 | Krutzsch et al. | ............... 60/274 |
| 5,925,463 | A | | 7/1999 | Reetz et al. | |

(Continued)

FOREIGN PATENT DOCUMENTS

DE    41 10 395 A1    10/1992

(Continued)

OTHER PUBLICATIONS

Dieselnet: "Catalyst Fundamentals", Dieselnet Technology Guide, "Online", Nov. 2000, XP02221702, Retrieved from Internet: URL:http://www.dieselnet.com/tech/cat_fund.html>.

*Primary Examiner*—Jessica L. Ward
*Assistant Examiner*—Devang Patel
(74) *Attorney, Agent, or Firm*—Pearne & Gordon LLP

(57) ABSTRACT

The invention relates to a device for the, (in particular continuous), oxidation of particulates from the exhaust gases of diesel motors. Said device consists of an open-pored body as a particle filter, on whose surface an oxidation catalyst is finely dispersed. The device is characterized in that from an exhaust gas temperature as low as 150° C., the catalyst causes the oxidation of particulates attached to the filter using the residual oxygen of the exhaust gas, thus keeping the filter body continuously free of particulates during almost all the operating conditions of the motor.

18 Claims, 2 Drawing Sheets

U.S. PATENT DOCUMENTS

Figure 1:
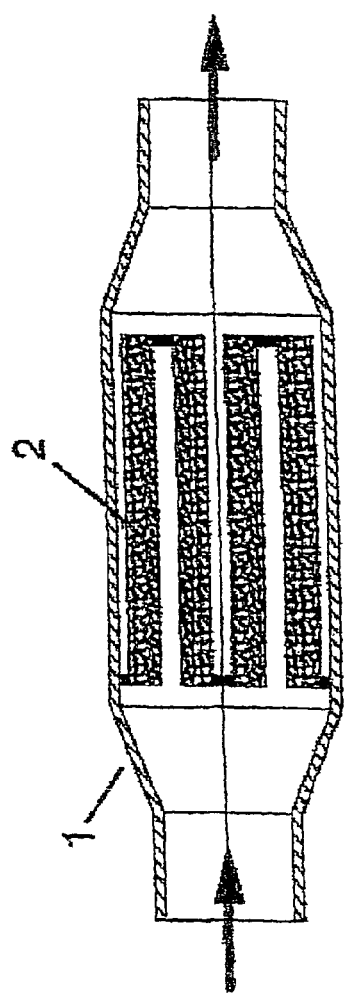

| | | | | |
|---|---|---|---|---|
| 6,013,599 | A | * | 1/2000 | Manson ..................... 502/340 |
| 2002/0116818 | A1 | * | 8/2002 | Bailey ..................... 29/890.08 |
| 2003/0113240 | A1 | * | 6/2003 | Dornseiffer et al. ......... 422/174 |

FOREIGN PATENT DOCUMENTS

| | | | |
|---|---|---|---|
| DE | 197 18 239 A1 | | 11/1998 |
| DE | 198 10 738 C1 | | 4/1999 |
| DE | 19904068 A1 | * | 8/2000 |
| EP | 0 341 832 A2 | | 11/1989 |
| EP | 0 758 713 A1 | | 2/1997 |
| EP | 0 870 543 A2 | | 10/1998 |
| EP | 1 026 373 A2 | | 8/2000 |
| EP | 1 055 805 A1 | | 11/2000 |
| EP | 1055805 A1 | * | 11/2000 |
| JP | 60054722 A | * | 3/1985 |
| JP | 06-050128 A | | 2/1994 |
| JP | 07-253013 A | | 10/1995 |
| JP | 09-053442 A | | 2/1997 |
| JP | 09-220423 A | | 8/1997 |
| JP | 2001-164924 A | | 6/2001 |
| WO | WO 98/48925 A1 | | 11/1998 |
| WO | WO 99/46488 A1 | | 9/1999 |
| WO | WO 00/21646 A1 | | 4/2000 |
| WO | WO 01/12320 A1 | | 2/2001 |

\* cited by examiner

DIESEL PARTICULATE FILTER COMPRISING A FINELY DISPERSED DIESEL PARTICULATE CATALYST

The invention relates to a particulate filter comprising a particulate catalyst, a method for producing the particulate filter as well its use.

Known diesel particulate filters comprise catalysts by means of which a blocking of the filter is counteracted. Such catalysts are called diesel particulate catalysts. Particulate catalysts from the exhaust gases of diesel engines settle on or in a filter, which consists of an open-pored body as a particle filter. A catalyst is applied hereon. By means of the catalyst, the particulates are, for example, oxidized.

In the last several decades, the continuous development of diesel engines for vehicles having a maximum allowable total weight of under 2.5 tons led to an ever greater reduction in the emission of pollutants. Thanks to the introduction of improved fuel injection technologies and/or an exhaust gas recirculation, modern diesel engines for small trucks and passenger cars only emit about 0.5 g/km of particulates, as well as around 100 ppm of nitrogen oxides in the partial load range. The current rate of development suggests, however, that the optimum with regard to the level of both pollutants in the exhaust gas has been reached, since any further attempt to lower the amount of one of the two components through design modifications of the diesel engine automatically leads to an increase in the production of the other pollutant. For the year 2005, however, the EU plans to drastically further lower the limiting value for this kind of diesel vehicles to 0.25 g/km for nitrogen oxides and 0.025 g/km for particles. In order to comply with these emission limits, a suitable secondary treatment of the exhaust gases is required. At present, efforts concentrate on the reduction of particulates from the exhaust gases since the emission of the nitrogen oxides already comes very close to the planned upper limiting value.

Particulate filters which, depending on their constructive design, filter out up to 95 wt-% of the carbon-particulate matter are an effective method for the reduction of particulates from the diesel exhaust gases. So-called wall-flow filters with a honeycomb-like structure in which their flow channels are alternatively blocked so that the exhaust gas must flow through the porous filter walls, are widely used.

However, the filters become blocked when the load of particulates increases, which leads to an increase in flow resistance and, correspondingly, to a reduction in engine performance. In order to counteract this blocking, the filters must, continually or in cyclical intervals, be freed of the carbon-particulate matter. The regeneration methods used at present in particle filters are based on thermal combustion, catalytic processes or on a combination of both methods.

For a purely thermal regeneration, temperatures in excess of 600° C. are required, temperatures which, however, the exhaust gas only reaches under few operating conditions of the engine. Therefore, either fuel-driven burners or electrically powered heating elements are used in this kind of cleaning, as can be seen in printed publications DE 19810738 C1 or DE 4110395 A1.

Because of the high energy demand of a purely thermal regeneration, additives which can lower the ignition temperature of the settled particulates down to 400° C. are also used in the fuel in certain methods. For example, PSA Peugeot Citroën describes a process in which an organic cerium compound is continually mixed with the fuel. This procedure effects a corresponding metal oxide enrichment of the carbon-particulate matter which is removed from the exhaust gases on a particle filter. Regeneration takes place in cyclical intervals by a short-term increase of the exhaust gas temperature to over 450° C., which leads to a burn-off of the filter-bound carbon-particulate matter which has been thus "activated". In order to reach this ignition temperature in the regeneration cycle, a relatively large amount of fuel is injected into the combustion chamber which effects an increase in hydrocarbon emission in the exhaust gases. This increase in concentration is calculated so that its oxidation in a platinum catalyst preceding the particle filter leads to a heating of the exhaust gas up to the regeneration temperature.

Further thermal regeneration methods are based on generating nitrogen dioxide as an oxidant for the filter-bound soot. For example, EP 341832 B1 and EP 1055805 A1 describe devices which consist of an oxidation catalyst for converting nitrogen oxide NO into Nitrogen dioxide $NO_2$ by means of residual oxygen in the exhaust gases, and a subsequent particle filter. In this case, the burn-off of the carbon-particulate matter occurs in a continuous manner even at temperatures below 400° C. if a sufficient concentration of nitrogen oxide is present in the exhaust gases. If necessary, the combustion of the carbon-particulate matter is supported by a suitable catalytic coating of the filter surface, as can bee seen from printed publications EP 0341832 A1 or WO 01/12320 A1, or from EP 0758713. The purely catalytic methods described are so-called self-cleaning of self-regenerating particle filters, which only oxidizes the surface-bound carbon-particulate matter because of a catalytic coating of the filter. Printed publication U.S. Pat. No. 6,013,599 describes an oxidation catalyst for particulates on the basis of mixed oxides which consists of the metal oxides of copper, iron and vanadium which, from an exhaust gas temperature of 380° C. upwards, leads to a cleaning of the filter-bound carbon-particulate matter. Printed publication U.S. Pat. No. 5,100,632 also discloses a self-cleaning diesel particulate filter, in which the ignition temperature of the carbon-particulate matter is lowered to 355° C. by a combination of a platinum/rhodium coating of the filter surface with an alkaline earth metal oxide.

Therefore, in all known regeneration methods, exhaust gas temperatures in excess of 355° C. are required in order to keep the particulate filter clear. Since these cannot be reached in many operating conditions of modern diesel engines, these methods are only suitable to a limited extent for the practical use in vehicles with a maximum allowable total weight of under 2.5 tons. Furthermore, all methods with an external application of energy into the exhaust gas system generally lower the degree of efficiency of the engine.

Therefore, it is the object of the invention to provide a filter which can be regenerated at comparatively lower exhaust gas temperatures. A further subject matter of the invention is the creation of a method for the production of the device.

The object of the invention is achieved by a device comprising the characterizing features of the first claim and the dependent claim. Advantageous embodiments arise from the dependent features. A production method as well as an advantageous manner of use arise from the corresponding dependent claims.

According to the invention, the object is achieved by a particulate filter comprising an open-pored body as a particle filter and a finely dispersed catalyst. A finely dispersed catalyst according to the invention is present when particulates cannot settle between two catalytically active centers. The fine dispersion on the surface of the body therefore results in an intensive contact between particulates which have settled thereon and the catalyst. In this way, a continuous oxidation of the carbon-particulate matter by the oxidants of the exhaust gases can be achieved from as low an exhaust gas temperature as 150° C. Furthermore, in principle, it is possible in this way that the catalyst may also take effect by using the residual oxygen of the exhaust gases.

The invention is based on the observation that the reaction capacity of an oxidation catalyst for diesel particulates settled in open-pored bodies increased corresponding to an increase of density by area of the catalytically active centers on the boundary surface accessible to the particulates which adjoins the gas space. This observation was supported by the knowledge that particulates which have settled on surfaces remain on the location of settling (in contrast to gas molecules) and cannot be sufficiently mobilized even by taking process engineering measures. Therefore, in catalytic particulate oxidation, the effective cross-section of the catalytically active centers in relation to area is much smaller than in heterogeneous gas catalysis, since the basic way in which a catalyst functions is based on direct contact with the participants in a reaction. In order to ensure sufficient particulate reaction activity, a fine dispersion of the catalyst is provided on the boundary surface accessible to the particulates which adjoins the gas space. A preferred dispersion has therefore been attained when the average distance of the individual catalytically active centers in relation to each other does just about not exceed the diameter of the smallest settled particulate unit (the so-called primary particulate structure). In that case, particulates cannot settle between catalyst material without coming into contact with the catalyst. If a particulate were able to settle on the body without having contact with the catalyst material, it would hardly be removable by catalysis.

Since at present the size of the so-called primary particulate structures in the exhaust gases is between 20 and 30 nm, a correspondingly finely dispersed catalyst coating would be the aim. The distance between two catalytically active centers would, in that case, generally not exceed 20 nm in order to be able to remove completely, by catalysis, the particulates settling on the body.

As well as the noble metals Pt, Pd, Rh, Re, or Ru, or transition-metal oxides, such as e.g. $V_2O_5$, $CeO_2$, $La_2O_3$, $MnO_2$, CuO, and mixtures or mixed oxides from and containing these compounds, all known types of catalyst which oxidize particulates are considered suitable.

However, catalysts are preferred which at least partially consist of noble metal oxides, in particular rhodium oxide $Rh_2O_3$, or which consist of oxides of yttrium and manganese or of mixed oxides from and containing these compounds, in particular yttrium manganite $YMn_2O_5$. Finely dispersed, these compounds showed the highest capacity for oxidizing carbon-particulate matter, and, in contrast to known noble metals and transition-metal oxides, did so even utilizing the residual oxygen content of the exhaust gases. This capacity for oxidizing carbon-particulate matter already began at a temperature of under 150° C. Surprisingly, these catalysts showed very little activity when tested for their capacity for oxidizing hydrocarbons.

In the presence of about 300 ppm nitrogen oxide in the particulate-loaded reaction gas, the specific particulate oxidation activity of these catalysts nearly doubled, so that a finely dispersed diesel particulate catalyst is preferably to be mounted, within the exhaust system, behind a nitrogen monoxide oxidation catalyst for generating nitrogen dioxide.

Basically, all open-pored bodies and fills made of ceramic and metallic material, or combinations of both, which have a high removal capacity for particulates over the total size range from $d_p=3$ nm to $d_p=10$ μm and allow a fine dispersion of the catalyst on the surface, are considered suitable for the device according to the invention.

Advantageously, a so-called depth filter is used, which in comparison to surface filters has a greater filter surface accessible to particulates. The filter body can be kept free continually when a depth filter is used. Advantageously, a so-called depth filter is used, which in comparison to surface filters has a greater surface which can be occupied by large particulates (with a diameter of $d_p>100$ nm). This advantage is based on the different designs of the pore structure in the two filter types. In depth filters, the open pore system is designed so that even the larger particulates can be removed deep within the filter body, whereby the effect of the filter extends over the total volume or the total surface of the filter. In surface filters, the pore structure which is a consequence of the design prevents penetration of these large particulates into the filter body, so that, to the greater extent, only the smaller outer part of the filter surface is occupied by the particulates. The intended fast formation of a filter cake associated with this process would make it difficult to keep a surface filter continually free by means of a finely dispersed particulate catalyst coating.

Preferably, the filter is combined with an electric heater. In particular, the electrical heater known from printed publication DE 19718239 A1 is used to eliminate reliably the blocking of the finely dispersed diesel catalyst in cases of emergency or under unfavorable operating conditions of the diesel engine, for example, a cold start.

In some cases, depending on the particulate load of the diesel exhaust gases or the desired filter efficiency, the combination of a depth filter with a subsequent surface filter which are both coated with catalyst material in a finely dispersed manner may be a preferable embodiment of the device according to the invention. By this measure, depending on the open porosity the individual modules are set to, a well directed fractionated removal of the particles is possible, which, if dimensioned favorably, results in an increase of the total degree of efficiency of the filter while at the same time minimizing the loss of pressure over the total extent of the filter.

It is the aim of the invention to provide a filter surface whose properties make a high rate of occupation by unit of area of the catalytically active centers possible, preferably permanently or for as long as possible.

The requirements with regard to the pore structure or the real surface of the suitable carrier materials are low compared with those of heterogeneous gas catalysts. Nanoporous carrier structures with pore diameters of less than 20 nm are not suitable, since, because of the size distribution of the particulates ($d_p>20$ nm) in the exhaust gases, these particles cannot enter the pore system. Therefore, if a catalyst were located there it would not add to the catalytic oxidation of particulates.

The carrier surface of the filter body according to the invention is only oriented on the boundary layer between the gas space and the carrier material which is accessible for the particulates. This so-called separation surface essentially does not differ from the actually available geometric boundary surface of the particle filters adjoining the gas space.

With regard to selection and spatial configuration of the carrier material, those measures are advantageous which contribute to maximizing the specific boundary surface carrying the catalyst. Such measures include optimization of surface roughness or the generation of open μm-pores close to the surface.

Thus, the known wash-coat processes are only suitable to a limited extent for producing the finely dispersed diesel particulate catalyst of the invention, since precursor compounds of the catalysts such as, e.g., water-soluble salts of noble metals, together with suitable ceramic powders, are applied to the carrier surfaces in the form of a suspension. After the coating has solidified and has been fixed by a calcination step, the catalyst is now activated and dispersed over the whole resulting thickness of the layer, therefore being, at least partially, inaccessible to the particulates. Therefore, in order to achieve a fine dispersion of the catalytically active centers on the separation surface according to the invention, the concentration, in the coating suspension, of the compounds forming the catalyst must be strongly increased. Such a measure is only feasible to a limited extent for reasons based on coating technology, as well as when noble metals are used.

Therefore, a method is preferred in which the catalyst particles are directly applied to the surface of a particle filter, In particular, these are pre-shaped and/or of nano scale, i.e. with diameters smaller than 100 nm. Therefore, the application, for example, is effected by using—in particular nano disperse—catalyst-colloid-coating solutions, which, for example, have been produced by using sol-gel technology or by a synthesis by means of micro- and miniemulsions.

In order to improve the fine dispersion of the catalyst particles onto the filter surface or the dosing of the amount of catalyst, it is advantageous to put opposite electric charges on the particles as well as on the filter boundary surfaces. As an auxiliary means for charging, all surface-active ionic compounds (such as, for example, Polydiallyldimethylammoniumchloride or polyacrylic acid are considered suitable, which can be applied to the respective surface with enough adhesion, and which can be removed from the border surface by means of a calcination, leaving little residue.

In order to improve the effectiveness of the regeneration, additional oxygen is introduced into the filter during operation. Ozone, which is particularly reactive, is to be preferred.

Further details, characterizing features and advantages of the invention result from the following descriptions, in which preferred embodiments including the pertinent illustrations are presented.

A first simple design example of the finely dispersed diesel particulate catalyst according to the invention is shown in FIG. 1. The device consists of a casing 1 which is located in an exhaust pipe. In the casing 1, a wall-flow depth filter coated with finely dispersed catalyst 2 is housed.

Figure 2:
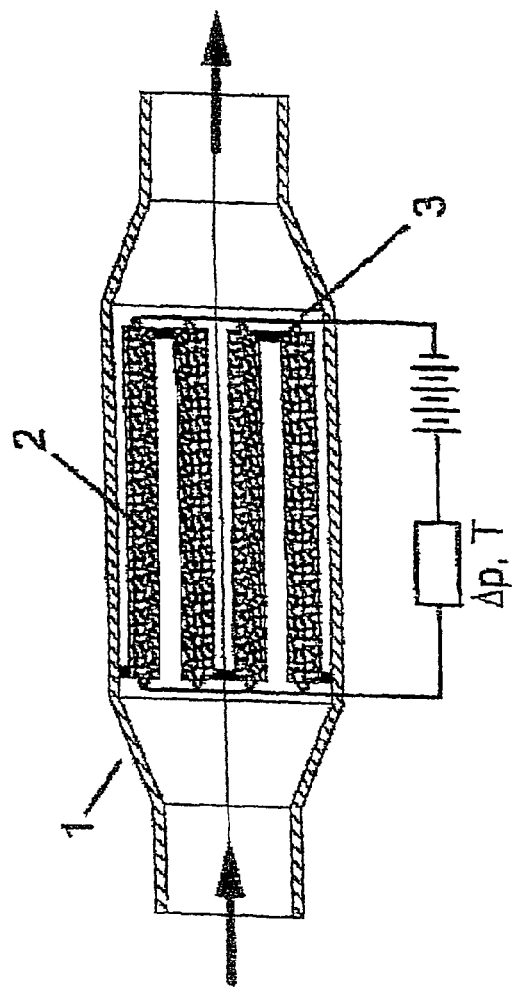

In a second embodiment according to FIG. 2, the wall flow depth filter is designed according to printed publication DE 19718239 A1 so that in unfavorable operating conditions of the engine or in case of emergency, the device according to the invention can be supplied with electric energy by means of a simple, temperature or pressure-operated electric contact 3, in order to bring the catalyst up to working temperature.

Figure 3:
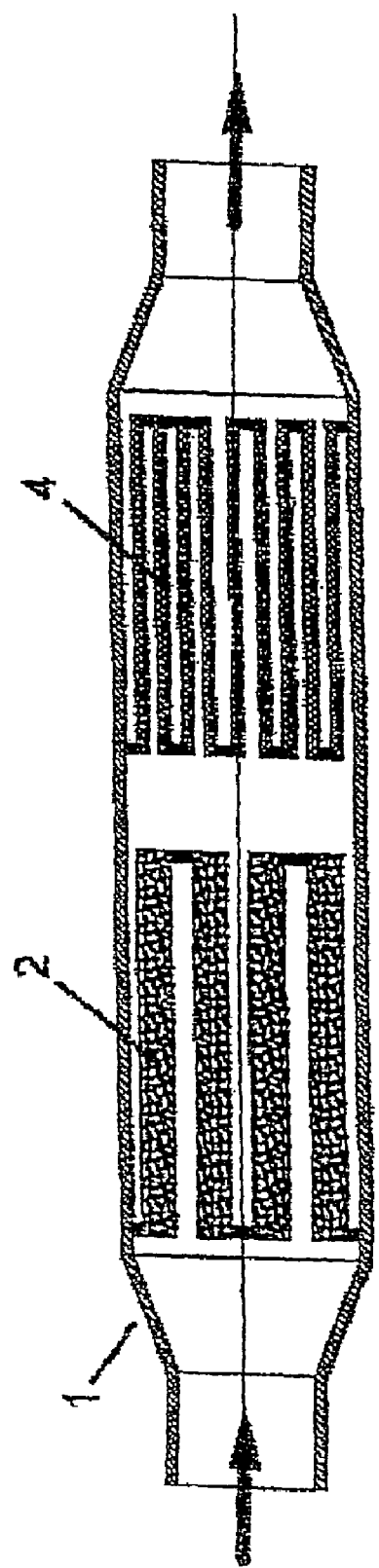

In a further embodiment according to FIG. 3, a wall flow depth filter 2 as well as a wall flow surface filter 4 are located within the casing 1 which are arranged in consecutive order and which have each been coated with catalyst material in a finely dispersed manner. The open porosities of both kinds of filters are designed so that, preferably, only the particulates larger than 100 nm are removed by the depth filter, which is situated upstream in relation to the direction of flow, while the small particulates of under a 100 nm are removed from the exhaust gases in the downstream surface filter, for the main part. By this means, the degree of efficiency of the whole filter can be adjusted variably. Also, the formation of a filter cake increasing the loss of pressure can be avoided by removing the large particulates in the inner pore system of the upstream depth filter.

Figure 4:
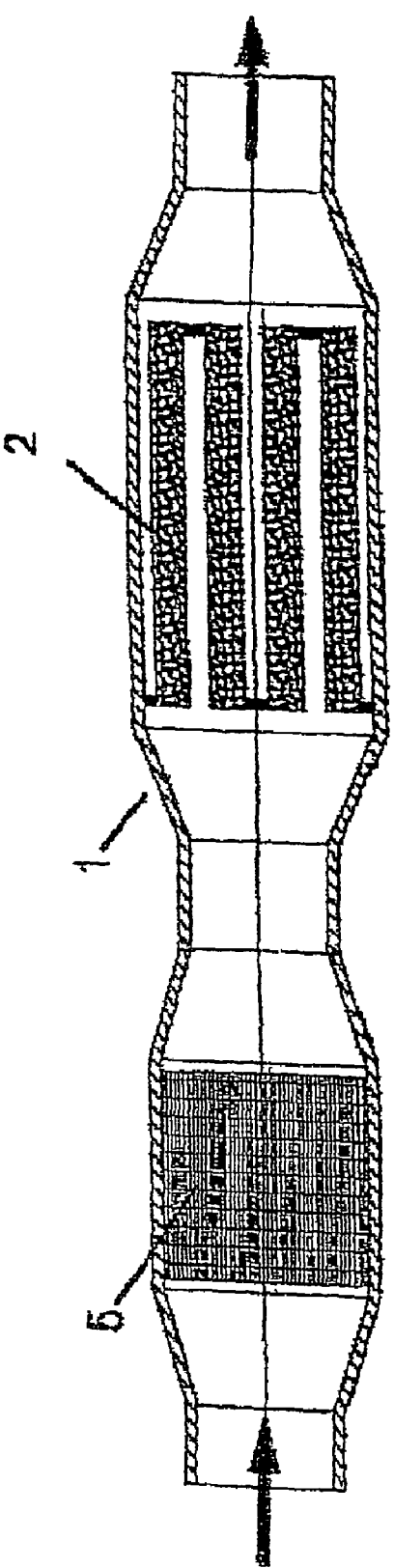

FIG. 4 shows another example of an embodiment, in which the device known from FIG. 1 is situated behind an oxidation catalyst 5 for the conversion of nitrogen monoxide into nitrogen dioxide.

Further preferred embodiments result from the combination of FIGS. 2 and 3 with the nitrogen monoxide converter known from FIG. 4.

In a first simple method for the production of a finely dispersed diesel particulate catalyst according to the invention, a filter body is dipped for a short period of time into a low-viscosity colloidal coating solution, in which the catalyst is already contained in the form of nanoparticles. After drying has taken place in a drying cabinet at around 120° C., the coated body is calcined at temperatures of 500° C. to 1200° C., depending on the type of catalyst, for the purpose of fixing the catalyst particles to the filter surface. The production of these coating dispersion takes place, for example, by hydrolysis of alcoholates of suitable transition metals or corresponding stochiometric mixtures according to the sol-gel technique. However, a synthesis by means of mini- or microemulsions is preferred, from which a monodisperse particle fraction is obtained which can vary between 3 and 1000 nm, depending on process parameters. In order to obtain the necessary fine catalyst dispersion, a multiple coating could possibly be necessary, depending on the adjustable particle concentration in the colloidal coating solution.

In a further method, the filter surface as well as the catalyst particles are provided with different electric charges prior to coating, in order to improve the fine dispersion of the catalyst onto the filter surface. For example, this takes place by impregnating the filter body with polyacrylic acid by immersion into a corresponding alcoholic or aqueous solution (and possibly drying in a drying cabinet at 80° C.) or additivation of the coating dispersion with a further ionic polymer, for example polydiallyldimethylammmoniumchloride, in order to provide the dispersed catalyst particles with an opposite electric charge. For the purpose of applying the finely dispersed catalyst layer onto the now negatively charged filter surface, the filter body is immersed in the coating solution until the concentration of the dispersed catalyst particles is no longer declining. After drying has taken place in a drying cabinet at around 120° C., the coated body is calcined, just as in method 1, at temperatures of 500° C. to 1200° C., depending on type of catalyst, for the purpose of fixing the catalyst particles to the filter surface.

The invention claimed is:

1. A method of continuously oxidizing particulate in an exhaust gas of a vehicle diesel engine comprising the steps of:
    providing a particulate filter comprising an open-pored body having pore diameters of more than 20 nm for filtering particulates, the open-pored body having a boundary surface accessible to the particulates, and a catalyst on the surface of the open-pored body for catalytic regeneration of the filter by oxidizing the particulate without combustion, said catalyst being finely dispersed catalyst particles spaced so that particulates cannot settle between two catalyst particles,
    passing said exhaust gas through said particulate filter, and oxidizing said particulate at a temperature of 150° C. or lower.

2. The method of claim 1, further including the step of adding ozone to said exhaust gas upstream front said particulate filter.

3. The method of claim 2, wherein said exhaust gas includes residual oxygen.

4. The method of claim 1, wherein said catalyst particles are of nano scale with diameters smaller than 100 nm.

5. The method of claim 1, wherein said catalyst is selected from the group consisting of noble metal oxides, oxides of yttrium and manganese, and mixtures thereof.

6. The method of claim 1, wherein said catalyst uses residual oxygen in an exhaust gas to effect oxidation of the particulates.

7. The method of claim 1, wherein adjacent catalyst particles have an average spacing no greater than 30 nm.

8. The method of claim 1, wherein said catalyst is selected from the group consisting of noble metal oxides, oxides of yttrium and manganese, and mixtures thereof, adjacent catalyst particles have an average spacing no greater than 30 nm, and said catalyst uses residual oxygen in an exhaust gas to effect oxidation of the particulates.

9. The method of claim 1, wherein said catalyst contains rhodium oxide and/or yttrium oxide.

10. The method of claim 1, wherein said particulate filter is located downstream from a nitrogen monoxide oxidation catalyst for generating nitrogen dioxide within an exhaust pipe of a vehicle having a diesel engine.

11. The method of claim 1, wherein said catalyst is selected from the group consisting of noble metal oxides, oxides of yttrium and manganese, and mixtures thereof, adjacent catalyst particles have an average spacing no greater than 30 nm, and said catalyst uses residual oxygen in an exhaust gas to effect oxidation of the particulates.

12. The method of claim 1, wherein said open-pored body is a depth filter and said the catalyst is an oxidation catalyst.

13. The method of claim 1, wherein said catalyst is selected from the group consisting of noble metal oxides, oxides of yttrium and manganese, and mixtures thereof, adjacent catalyst particles have an average spacing no greater than 30 nm, and said catalyst uses residual oxygen in an exhaust gas to effect oxidation of the particulates.

14. The method of claim 1, wherein said open-pored body comprises a depth filter and a surface filter which are connected in series, each filter element having a boundary surface coated with said catalyst, and said catalyst is an oxidation catalyst.

15. The method of claim 1, wherein said catalyst is selected from the group consisting of noble metal oxides, oxides of yttrium and manganese, and mixtures thereof, adjacent catalyst particles have an average spacing no greater than 30 nm, and said catalyst uses residual oxygen in an exhaust gas to effect oxidation of the particulates.

16. The method of claim 1, wherein said open-pored body comprises an electric semiconductor for electrically heating said catalyst.

17. The method of claim 16, wherein said catalyst is selected from the group consisting of noble metal oxides, oxides of yttrium and manganese, and mixtures thereof, adjacent catalyst particles have an average spacing no greater than 30 nm, and said catalyst uses residual oxygen in an exhaust gas to effect oxidation of the particulates.

18. The method of claim 1, wherein said catalyst is dispersed along said boundary surface by contacting the boundary surface with a colloidal coating solution containing said catalyst.

* * * * *

UNITED STATES PATENT AND TRADEMARK OFFICE
CERTIFICATE OF CORRECTION

PATENT NO. : 7,666,376 B2  Page 1 of 1
APPLICATION NO. : 10/481822
DATED : February 23, 2010
INVENTOR(S) : Dornseiffer et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1134 days.

Signed and Sealed this

Seventh Day of December, 2010

David J. Kappos
*Director of the United States Patent and Trademark Office*